Figure 1:
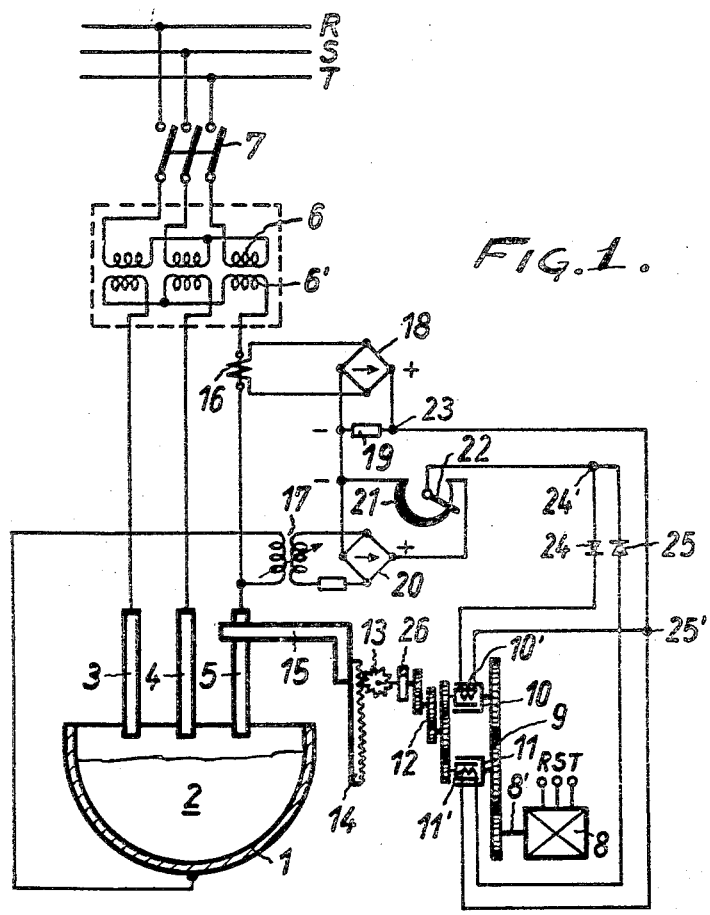

Inventors:
OTTO GREBE, ALBERT DRILLER
AND KURT BÜHRING
BY:

United States Patent Office 2,773,112
Patented Dec. 4, 1956

2,773,112

ARRANGEMENT FOR POSITIONING ELECTRODES OF AN ELECTRIC ARC FURNACE

Otto Grebe, Olpe, Westphalia, Albert Driller, Frankfurt am Main, and Kurt Bühring, Frankfurt, Bockenheim, Germany, assignors to Licentia Patent-Verwaltungs-G. m. b. H., Hamburg, Germany Application October 5, 1953, Serial No. 384,212

Claims priority, application Germany October 3, 1952

11 Claims. (Cl. 13—13)

The present invention relates to electric arc furnaces, and in particular to a positioning arrangement for positioning the electrodes used with such furnaces.

Positioning arrangements for electrodes of an electric arc furnace are known. One of such arrangements employs an electric motor for positioning the relevant electrodes used in conjunction with an electric arc furnace. A disadvantage underlying the use of such electric motor lies in the fact that the mass of the electromotor, for driving the electrodes and supporting structure thereof is generally very large. As a result a long time period is required for accelerating and decelerating the motor so that the positioning operation of the electrodes of an electric arc furnace is disadvantageously controlled. This is especially true if it should be required to repeatedly reverse the direction of rotation of the motor since it is necessary before reversing the direction of motor rotation to first brake the motor after which the direction of rotation of the motor may be changed.

The present invention provides an arrangement for regulating the position of the electrodes of an electric arc furnace in which the above set forth disadvantages are eliminated.

In accordance with the present invention instead of driving the electrodes directly by means of a motor, at least one electrically operated coupling means, such as for instance, an electromagnetic fluid or powder clutch, is used which, when energized, transmits the driving force of a continuously rotating motor to an electrode supporting member to thereby effectively position the electrode of an electric arc furnace. The disadvantage arising from the inertial moment of the motor is avoided through the use of the electrically operated electromagnetic clutch since in the arrangement in accordance with the invention, the motor need not be accelerated nor decelerated.

The inertial mass of the electrically operated electromagnetic clutch is equal to a fraction of that of the driving motor and will not therefore detrimentally affect the regulating operation of the electrodes. Only small electrical power requirements are necessary for the effective control of the electrically operated electromagnetic clutch, such small power requirements being easily obtained from electrical circuits sensitive to one or more electrical quantities whose magnitudes are dependent on and vary in accordance with variations of the electrical characteristics of an arc between the electrodes and a charge to be melted in the receiver.

It is an object of the present invention to provide an arrangement for efficiently and accurately positioning the electrodes of an electric arc furnace.

It is another object of the present invention to provide an arrangement for rapidly positioning the electrodes of an electric arc furnace.

It is still another object of the present invention to provide an arrangement for positioning the electrodes of an electric arc furnace in dependence on an electrical quantity whose magnitude is dependent on and varies in accordance with variations of the electrical characteristics of an electrical arc.

With the above objects in view the present invention mainly consists of an arrangement for adjusting the position of an electrode of an electric arc furnace comprising a receiver adapted to hold a charge to be melted, support means having an electrode carrier portion adapted to hold an electrode over the charge in the receiver so as to enable formation of an arc between the electrode and the charge, the support means being movable toward and away from the charge in the receiver, rotatable driving means, means permanently rotating the rotatable driving means, first electrically operable coupling means for interconnecting the movable support means and the driving means during rotation of the latter for moving the electrode carrier portion of the support means toward the charge in the receiver, second electrically operable coupling means for interconnecting the movable support means and the driving means during rotation of the latter for moving the electrode carrier portion of the support means away from the charge in the receiver, and an electrical control circuit for controlling the actuation of the first and second electrically operable coupling means, the electrical control circuit comprising a first and a second rectifier connected in series with each other forming a first junction, a first energizing winding forming part of the first electrically operable coupling means and actuating the latter when energized, a second energizing winding forming part of the second electrically operable coupling means and actuating the latter when energized, the first and second windings being connected in series with each other so as to form a second junction, the free electrodes of the first and second rectifiers being respectively connected to the free terminals of the first and second energizing windings thereby forming a bridge circuit, and a first and a second variable voltage source respectively connected to the first and second junctions, the magnitudes of the voltage supplied by the first and second variable voltage source being dependent on an electrical quantity whose magnitude is dependent on and varies in accordance with variations of the electrical characteristics of the arc, the winding being energized depending upon the relative magnitude of the voltages supplied by the first and second voltage source.

Figure 2:
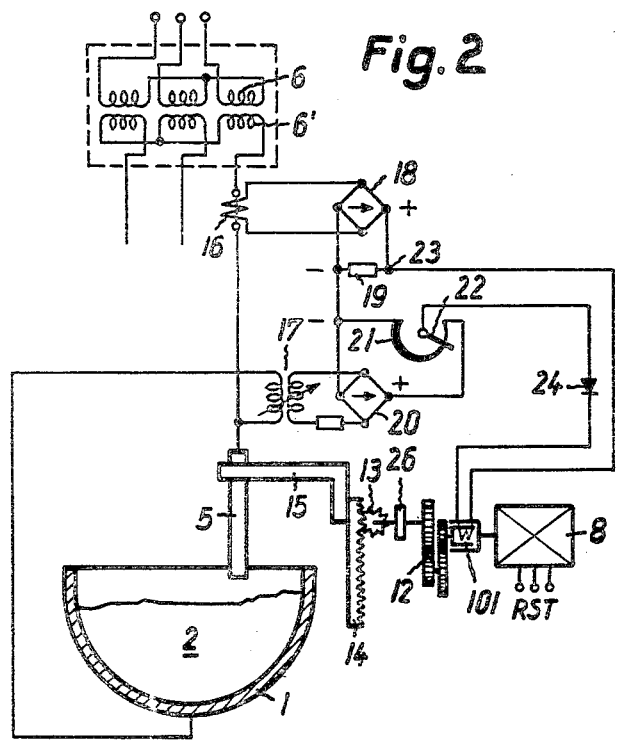

Other objects of the invention as well as advantages thereof will be apparent from the detailed description of the drawings which follow and which illustrate schematically electrode positioning arrangements for electric arc furnaces in accordance with the present invention. The invention itself, both as to its construction and its method of operation, will be best understood from the following description of specific embodiments when read in connection with the accompanying drawings, in which:

Fig. 1 is an electrical schematic diagram of the present invention, showing portions of the apparatus in diagrammatic form; and Fig. 2 is an electrical schematic diagram of the present invention showing a second embodiment thereof.

In the drawings, arrangements for adjusting the position of only one of the electrodes are illustrated. It is to be understood that the other electrodes are positioned by similar arrangements.

Referring to the drawings and more particularly to Fig. 1, three primary windings 6 of a polyphase transformer are connected by means of switch 7 to the three-phase voltage source, RST. The three star connected secondary windings 6' are inductively coupled to the three primary windings 6 and are in turn connected to the electrodes 3, 4 and 5, respectively.

Each of the electrodes 3, 4 and 5 are spaced from the substance, or charge 2, to be melted in the chamber, or receiver 1. The electrode 5 is supported by a supporting member 15 which is rigidly connected to a rack 14, which is in turn driven by a gear transmission system. As is apparent from the drawing the electrode 5 will be moved toward or away from the receiver 2 when the gear transmission system is actuated. As noted heretofore, the drawing shows only an adjusting arrangement for positioning the single electrode 5. An arrangement similar to that used for positioning the electrode 5 is used for positioning the electrodes 3 and 4. In the interest of simplifying the drawing, the positioning arrangement for positioning the electrodes 3 and 4 have not been shown.

The driving force for moving the electrode 5 is obtained from an electric motor 8. In the drawing a polyphase induction motor is illustrated which is connected to the three-phase line RST. If desirable, however, a direct current motor may be used for supplying the necessary driving force for positioning the electrode 5. In contradistinction to previous arrangements, the motor 8 rotates continuously in the arrangement in accordance with the invention, that is to say the motor, in order to position the electrode 5 in either direction, toward or away from the receiver, need not first be accelerated and thereafter decelerated. The motor 8 drives the shaft 8' which in turn drives the electromagnetic clutches 10 and 11 by means of the gear transmission system 9 which is so arranged, that when the electromagnetic clutch 10 is actuated the electrode 5 is moved away from the charge 2 to be melted, whereas when the other electromagnetic clutch 11 is actuated, the electrode 5 will be moved toward the charge 2 which is to be melted in the receiver 1. The driving force of the motor 8, which is transferred by the actuation of one of the electromagnetic clutches 10 or 11, is transmitted to a pinion gear 13 by means of the gear drive system 12. The pinion gear 13 in turn actuates the rack 14 to thereby move the supporting member 15 having an electrode carrier portion carrying the electrode 5 which is thereupon moved toward or away from the charge 2 in the receiver 1, depending upon which of the electromagnetic clutches 10 or 11 is actuated. An electromagnetic actuated brake 26 may be inserted if desired between the gear drive system 12 and the pinion gear 13 to permit further control of the positioning arrangement in accordance with the arrangement.

The positioning adjustment of the electrode 5 may be made dependent on any one of the electrical quantities whose magnitudes are dependent upon and vary in accordance with variations of the electrical characteristics of the arc produced between the electrode 5 and the charge 2 in the receiver 1. If desired, the adjusting arrangement can be controlled by one electrical quantity or, if desired, more than one electrical quantity may be used as exemplified in the drawing, e. g. current and voltage. The magnitude of the current, which varies in accordance with variations of the electrical characteristics of the arc produced between the electrode 5 and the charge 2 in the receiver 1, is sensed by the current transformer 16. The magnitude of the voltage which likewise varies in accordance with variations of the electrical characteristics of the arc produced between the electrode 5 and the charge 2 in the receiver 1, is sensed by the voltage transformer 17, the primary of which is connected to the electrode 5 and to the charge 2 in the receiver 1. The current induced in the current transformer 16 is rectified by a bridge rectifier 18, the rectified D. C. voltage forming a first variable voltage supply developed across the fixed resistor 19. It is apparent that the magnitude of the voltage developed across the fixed resistor 19 is a function of the magnitude of the current flowing through the transformer 16 which as noted varies in accordance with the variations of the electrical characteristics of the arc.

The voltage induced in the secondary winding of the voltage transformer 17 is also rectified, by a bridge rectifier 20, the rectified D. C. voltage forming a second variable voltage supply connected across a rheostat 21. The magnitude of the second variable voltage supply may itself be varied by means of the sliding contact arm 22. The magnitude of the voltage developed across the rheostat 21 is a function of the magnitude of the voltage appearing across the primary winding of the voltage transformer 17 and the turns ratio of the primary and secondary windings thereof, the magnitude of the voltage across the primary winding varying in accordance with the variations of the electrical characteristics of the arc.

The first and second variable voltage supplies have the negative terminals thereof connected to each other. To the positive terminal of the first variable voltage supply and the sliding contact arm 22 of the rheostat 21, across which is connected the second variable voltage supply, is connected a bridge circuit for controlling the actuation of one or the other of the electromagnetic clutches 10 and 11. The bridge circuit comprises a first rectifier 24, a second rectifier 25, the rectifiers 24 and 25 being connected in series to form a first junction 24', and a first and a second energizing winding 10' and 11' forming part of the electromagnetic clutches 10 and 11 respectively, the first and second energizing windings 10' and 11' being connected in series to form a second junction 25', the free terminals of the energizing windings 10' and 11' being connected to the free terminals of the rectifiers 24 and 25 respectively. With the bridge circuit connected as outlined above one or the other of the energizing windings will be energized depending upon the relative magnitudes of the voltages connected to the first and second junctions 24' and 25' respectively. Upon the energization of one or the other of the energizing windings 10' or 11', one of the electromagnetic clutches will be actuated, depending upon which of the windings is energized.

If the bridge circuit is balanced no current will flow through the energizing windings of the electromagnetic clutches and as a result the electrode 5 will remain in stationary position. The adjusting process takes place when the voltage or the current values of the electric arc exceed a predetermined definite level which results in a changed relationship of the voltages connected to said first and second junctions 24' and 25', respectively, and thereby unbalances the bridge circuit so that current will flow either through the rectifier 24 or the rectifier 25 depending on the relative magnitudes of the voltages connected to junctions 24 and 25.

It is also possible to effect the positioning of the electrode 5 with only one electromagnetic clutch. This is shown in Fig. 2 wherein the clutches 10' and 11' and the intermediate gearing between these clutches and the motor 8 have been replaced by a single electromagnetic clutch 101. In this embodiment, the electrode 5 will be moved away from the charge in the receiver when the electromagnetic clutch 101 is energized, while the electrode is moved toward the charge in the receiver by the force of gravity after the electromagnetic clutch 101 is deenergized.

It will be understood that each of the elements described above, or two or more together, may also find a useful application in other types of electric arc furnaces differing from the types described above.

While the invention has been illustrated and described as embodied in electrically controllable electric arc furnaces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for adjusting the position of an electrode of an electric arc furnace, comprising, in combination, a receiver adapted to hold a charge to be melted; support means having an electrode carrier portion adapted to hold an electrode over said charge in said receiver so as to enable formation of an arc between said electrode and said charge, said support means being movable toward and away from said charge in said receiver; rotatable driving means; means for permanently rotating said driving means; and coupling means having a variable transmission ratio for interconnecting said movable support means and said driving means during rotation of the latter for moving said electrode carrier portion of said support means toward and away from said charge in said receiver.

2. An arrangement for adjusting the position of an electrode of an electric arc furnace, comprising, in combination, a receiver adapted to hold a charge to be melted; support means having an electrode carrier portion adapted to hold an electrode over said charge in said receiver so as to enable formation of an arc between said electrode and said charge, said support means being movable toward and away from said charge in said receiver; rotatable driving means; means for permanently rotating said driving means; and electrically operable coupling means having a variable transmission ratio proportional to and actuated by an electrical quantity whose magnitude is dependent on and varies in accordance with variations of the electrical characteristics of said arc, said coupling means interconnecting said movable support means and said driving means during rotation of the latter for moving said electrode carrier portion of said support means toward and away from said charge in said receiver depending upon variations of the electric characteristics of said arc.

3. An arrangement for adjusting the position of an electrode of an electric arc furnace, comprising, in combination, a receiver adapted to hold a charge to be melted; support means having an electrode carrier portion adapted to hold an electrode, said support means being movable toward and away from said charge in said receiver; rotatable driving means; means permanently rotating said driving means; first coupling means having a variable transmission ratio for interconnecting said movable support means and said driving means during rotation of the latter for moving said electrode carrier portion of said support means toward said charge in said receiver; and second coupling means having a variable transmission ratio for interconnecting said movable support means and said driving means during rotation of the latter for moving said electrode carrier portion of said support means away from said charge in said receiver.

4. An arrangement for adjusting the position of an electrode of an electric arc furnace, comprising, in combination, a receiver adapted to hold a charge to be melted; support means having an electrode carrier portion adapted to hold an electrode over said charge in said receiver so as to enable formation of an arc between said electrode and said charge, said support means being movable toward and away from said charge in said receiver; rotatable driving means; means for permanently rotating said driving means; and electromagnetic coupling means having a variable transmission ratio proportional to and actuated by an electrical quantity whose magnitude is dependent on and varies in accordance with variations of the electrical characteristics of said arc, said electromagnetic coupling means interconnecting said movable support means and said driving means during rotation of the latter for moving said electrode carrier portion of said support means toward and away from said charge in said receiver depending upon variations of the electric characteristics of said arc.

5. An arrangement for adjusting the position of an electrode of an electric arc furnace, comprising, in combination, a receiver adapted to hold a charge to be melted; support means having an electrode carrier portion adapted to hold an electrode, said support means being movable toward and away from said charge in said receiver; rotatable driving means; means permanently rotating said driving means; first electromagnetic coupling means for interconnecting said movable support means and said driving means during rotation of the latter for moving said electrode carrier portion of said support means toward said charge in said receiver; and second electromagnetic coupling means for interconnecting said movable support means and said driving means during rotation of the latter for moving said electrode carrier portion of said support means away from said charge in said receiver, said first and second electromagnetic coupling means each having a variable transmission ratio proportional to and being energized by electrical quantities whose magnitudes are dependent on and vary in accordance with variations of the electrical characteristics of said arc.

6. An arrangement for adjusting the position of an electrode of an electric arc furnace, comprising, in combination, a receiver adapted to hold a charge to be melted; support means having an electrode carrier portion adapted to hold an electrode over said charge in said receiver so as to enable formation of an arc between said electrode and said charge, said support means being movable toward and away from said charge in said receiver; a rotatable shaft; a motor for permanently rotating said rotatable shaft; and electrically operable coupling means having a variable transmission ratio proportional to and actuated by an electrical quantity whose magnitude is dependent on and varies in accordance with variations of the electrical characteristics of said arc, said coupling means interconnecting said movable support means and said rotatable shaft during rotation of the latter for moving said electrode carrier portion of said support means toward and away from said charge in said receiver depending upon variations of the electric characteristics of said arc.

7. An arrangement for adjusting the position of an electrode of an electric arc furnace, comprising, in combination, a receiver adapted to hold a charge to be melted; support means having an electrode carrier portion adapted to hold an electrode, said support means being movable toward and away from said charge in said receiver; a rotatable shaft; a motor permanently rotating said rotatable shaft; first electrically operable coupling means for interconnecting said movable support means and said rotatable shaft during rotation of the latter for moving said electrode carrier portion of said support means toward said charge in said receiver; and second electrically operable coupling means for interconnecting said movable support means and said rotatable shaft during rotation of the latter for moving said electrode carrier portion of said support means away from said charge in said receiver, said first and second electrically operable coupling means each having a variable transmission ratio proportional to and being energized by electrical quantities whose magnitudes are dependent on and vary in accordance with variations of the electrical characteristics of said arc.

8. An arrangement for adjusting the position of an electrode of an electric arc furnace, comprising, in combination, a receiver adapted to hold a charge to be melted; support means having an electrode carrier portion adapted to hold an electrode over said charge in said receiver so as to enable formation of an arc between said electrode and said charge, said support means being movable toward and away from said charge in said receiver; rotatable driving means; means for permanently rotating said driving means; electrically operable coupling means having a variable transmission ratio for interconnecting said movable support means and said driving means during rotation of the latter for moving said electrode carrier portion of said support means toward and away from said charge in said receiver; and electrical actuating means creating an electrical quantity depending upon and varying in accordance with variations of the electrical characteristics of said arc between said electrode and said charge, said electrical quantity actuating said electrically operable coupling means and varying the transmission ratio thereof in accordance with variations of the electrical characteristics of said arc.

9. An arrangement for adjusting the position of an electrode of an electric arc furnace, comprising, in combination, a receiver adapted to hold a charge to be melted; support means having an electrode carrier portion adapted to hold an electrode over said charge in said receiver so as to enable formation of an arc between said electrode and said charge, said support means being movable toward and away from said charge in said receiver; rotatable driving means; means permanently rotating said rotatable driving means; first electrically operable coupling means having a variable transmission ratio for interconnecting said movable support means and said driving means during rotation of the latter for moving said electrode carrier portion of said support means toward said charge in said receiver; second electrically operable coupling means having a variable transmission ratio for interconnecting said movable support means and said driving means during rotation of the latter for moving said electrode carrier portion of said support means away from said charge in said receiver; and electrical actuating means creating an electrical quantity depending upon and varying in accordance with variations of the electrical characteristics of said arc between said electrodes and said charge, said electrical quantity actuating said first and second electrically operable coupling means and varying the transmission ratio thereof in accordance with variations of the electrical characteristics of said arc.

10. An arrangement for adjusting the position of an electrode of an electric arc furnace, comprising, in combination, a receiver adapted to hold a charge to be melted; support means having an electrode carrier portion adapted to hold an electrode over said charge in said receiver so as to enable formation of an arc between said electrode and said charge, said support means being movable toward and away from said charge in said receiver; rotatable driving means; means permanently rotating said rotatable driving means; first electrically operable coupling means for interconnecting said movable support means and said driving means during rotation of the latter for moving said electrode carrier portion of said support means toward said charge in said receiver; second electrically operable coupling means for interconnecting said movable support means and said driving means during rotation of the latter for moving said electrode carrier portion of said support means away from said charge in said receiver; and an electrical control circuit for controlling the actuation of said first and second electrically operable coupling means, said electrical control circuit comprising a first and a second rectifier connected in series with each other forming a first junction, a first energizing winding forming part of said first electrically operable coupling means and actuating the latter when energized, a second energizing winding forming part of said second electrically operable coupling means and actuating the latter when energized, said first and second windings being connected in series with each other so as to form a second junction, the free electrodes of said first and second rectifiers being respectively connected to the free terminals of said first and second energizing windings thereby forming a bridge circuit, and a first and a second variable voltage source respectively connected to said first and second junctions, the magnitudes of the voltage supplied by said first and second variable voltage source being dependent on an electrical quantity whose magnitude is dependent on and varies in accordance with variations of the electrical characteristics of said arc, the winding being energized depending upon the relative magnitude of the voltages supplied by said first and second voltage source.

11. An arrangement for adjusting the position of an electrode of an electric arc furnace, comprising, in combination, a receiver adapted to hold a charge to be melted; support means having an electrode carrier portion adapted to hold an electrode over said charge in said receiver so as to enable formation of an arc between said electrode and said charge, said support means being movable toward and away from said charge in said receiver; rotatable driving means; means permanently rotating said rotatable driving means; first electrically operable coupling means for interconnecting said movable support means and said driving means during rotation of the latter for moving said electrode carrier portion of said support means toward said charge in said receiver; second electrically operable coupling means for interconnecting said movable support means and said driving means during rotation of the latter for moving said electrode carrier portion of said support means away from said charge in said receiver; and an electrical control circuit for controlling the actuation of said first and second electrically operable means, said electrical control circuit comprising a first and a second rectifier each having one of its electrodes connected to a different one of the electrodes of the other rectifier so as to form a first junction, a first energizing winding forming part of said first electrically operable coupling means and actuating the latter when energized, a second energizing winding forming part of said second electrically operable coupling means and actuating the latter when energized, said first and second windings being connected in series with each other so as to form a second junction, the free electrodes of said first and second rectifiers being respectively connected to the free terminals of said first and second energizing windings thereby forming a bridge circuit, and a first and a second variable voltage source respectively connected to said first and second junctions, the magnitudes of the voltage supplied by said first and second variable voltage source being dependent on and varying in accordance with variations of the electrical characteristics of said arc, the winding being energized depending upon the relative magnitude of the voltages supplied by said first and second voltage source.

References Cited in the file of this patent

UNITED STATES PATENTS

| | | |
|---|---|---|
| 645,784 | Bowen | Mar. 30, 1900 |
| 790,226 | Prenner | May 16, 1905 |
| 1,626,431 | Seede | Apr. 26, 1927 |
| 1,645,049 | Harford | Oct. 11, 1927 |
| 1,648,563 | Morton | Nov. 8, 1927 |
| 1,901,426 | Young | Mar. 14, 1933 |
| 2,386,402 | Lilja | Oct. 9, 1945 |
| 2,527,830 | Lilja | Oct. 31, 1950 |
| 2,556,318 | Cooper | June 12, 1951 |

FOREIGN PATENTS

| | | |
|---|---|---|
| 264,851 | Great Britain | July 14, 1927 |
| 325,702 | Germany | Sept. 17, 1920 |